United States Patent [19]

Juhlin

[11] 4,199,804
[45] Apr. 22, 1980

[54] METHOD AND APPARATUS FOR CONTROLLING THE ALTERNATING VOLTAGE OF A STATIC CONVERTOR

[75] Inventor: Lars-Erik Juhlin, Ludvika, Sweden
[73] Assignee: ASEA Aktiebolag, Vasteras, Sweden
[21] Appl. No.: 888,587
[22] Filed: Mar. 20, 1978
[30] Foreign Application Priority Data
Mar. 28, 1977 [SE] Sweden .............................. 7703490
[51] Int. Cl.² ........................................... H02M 1/18
[52] U.S. Cl. .................................... 363/51; 323/102; 363/79
[58] Field of Search ...................... 323/102, 119, 128; 363/51-58, 79, 83, 95-99, 115, 118

[56] References Cited

U.S. PATENT DOCUMENTS

| | | | |
|---|---|---|---|
| 3,424,971 | 1/1969 | Stackegard ............................ | 363/99 |
| 3,450,983 | 6/1969 | Koppelmann et al. .......... | 323/128 X |
| 3,551,778 | 12/1970 | Ekström ............................ | 363/96 X |

*Primary Examiner*—William M. Shoop
*Attorney, Agent, or Firm*—Pollock, Vande Sande & Priddy

[57] ABSTRACT

An improved reactive power control for a static convertor wherein the improved control compensates for voltage transients caused by the connection and disconnection of reactance elements in an AC convertor network by making corresponding transient adjustments in a normal control angle of the convertor. A maximum angular increment in the direction of 90° is applied to the normal control angle when the AC reactance switching occurs. If a capacitive reactance element is connected to the AC network, the maximum angular increment is rapidly built up after the connection and is thereafter gradually reduced. If the capacitive reactive element is disconnected from the AC network, the maximum angular increment is gradually built-up prior to the disconnection and after the disconnection the maximum angular increment is rapidly reduced. The sequence of incremental control angle build-up and reduction is reversed if the reactance element is a reactor.

12 Claims, 4 Drawing Figures

METHOD AND APPARATUS FOR CONTROLLING THE ALTERNATING VOLTAGE OF A STATIC CONVERTOR

BACKGROUND OF THE INVENTION

The invention relates to an improved reactive power control for a static convertor, and, more particularly, to such a control including means to compensate for voltage transients caused by the connection and disconnection of reactance elements in an AC convertor network.

If a static convertor is used to provide an operational connection between a direct current network and an alternating current network, it is necessary to compensate for the variable consumption of reactive power by the convertor. Some prior art systems have compensated for this reactive power consumption by alternately connecting and disconnecting reactance elements, such as capacitors or reactors, on the AC side of the convertor. Such prior art systems have generally used step switches to incrementally connect or disconnect the reactance elements from the AC network. In addition, other systems have supplemented the reactive switching control scheme with apparatus for altering the angular control of a convertor in accordance with variations in reactive power.

For example, the U.S. Patent to Stackegard, U.S. Pat. No. 3,424,971, "Means for Controlling Reactive Power in an Invertor Station", discloses an apparatus that utilizes the angluar control of an invertor to supplement the reactive power compensation control of the switched reactance elements. The patent discloses apparatus to temporarily increase the margin of commutation of an invertor or increase the lower limit of the control angle of a rectifier in order to provide such supplemental reactive power control.

One problem of the prior art reactive power control methods is that they produce undesirable voltage transients when the reactance elements are connected or disconnected from the AC network. This voltage transient problem is particularly troublesome when the reactive elements are switched in a weak AC circuit.

Although it has been suggested that the voltage transient problem could be avoided by continuously controlling the reactive power of the network by means of a continuous angular control of the convertor, such a solution would require that the convertor would normally work with an unnecessarily great reactive power.

Accordingly, it is an object of the invention to provide a simple and effective means to compensate for voltage transients induced in an AC network without unduly increasing the operational reactive power of the convertor.

A further object of the invention is to provide an apparatus to compensate for voltage transients in an AC network by minimal adjustments to the angular control of the network convertor.

Another object of the invention is to provide an angular control apparatus that will momentarily adjust the angular control of the convertor to compensate for voltage transients when a reactance element is connected or disconnected from the AC network and will return the control angle to its original value after the transients have passed.

A further object of the invention is to compensate for a rapid change in the convertor control angle by either gradually building up the normal control angle to its maximum momentary compensation value or gradually reducing the maximum momentary value to the normal control angle value.

These and other objects of this invention will become apparent from a review of the detailed specification which follows and a consideration of the accompanying drawings.

BRIEF SUMMARY OF THE INVENTION

In order to achieve the objects of the invention and to overcome the problems of the prior art, the improved reactive power control, according to the invention, includes means to momentarily alter the magnitude of the control angle of the convertor to compensate for voltage transients that are induced in the AC network when reactance elements are connected or disconnected from the network. More particularly, an embodiment of the invention is adapted to rapidly change the normal control angle of an invertor toward 90° when, for example, a capacitor element is initially connected with the AC network. The change in control angle reaches a maximum value immediately following the connection of the capacitor element and is thereafter gradually reduced over a short period of time, for example a few seconds, until the control angle has been returned to its original normal value. It should be appreciated that the momentary shift in the convertor control angle will compensate for the voltage transients that were generated by the connection of the capacitor element to the AC network.

When a disconnection of a capacitor element is initiated in the course of the operation of the convertor, the embodiment of the invention is adapted to gradually change the control angle towards 90° so that the incremental change in the control angle reaches a maximum just before the capacitor element is disconnected from the AC network. The incremental change in the control angle is rapidly reduced to zero immediately following the disconnection of the capacitor element from the network.

It should be appreciated from the above discussion that the operation of the embodiment of the invention will be reversed if the switched reactance element is a reactor instead of a capacitor. That is, the sequence of the incremental change of the normal control angle will be the same for a disconnected reactor element as for a connected capacitor element and, likewise, the sequence of the incremental control angle change will be the same for a connected reactor element as for a disconnected capacitor element.

DETAILED DESCRIPTION OF PREFERRED EMBODIMENTS

Figure 1:
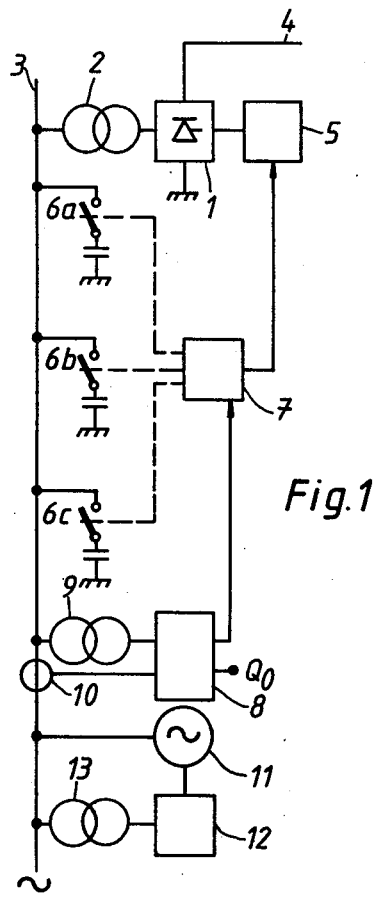
FIG. 1 shows a circuit diagram of a reactive power control system of the invention.

The remaining portion of this specification will describe preferred embodiments of the invention when read in conjunction with the attached drawings, in which like reference characters identify identical apparatus.

FIG. 1 shows a circuit diagram of a reactive power control embodiment of the invention. It will be appreciated from an examination of FIG. 1 that a convertor 1 is connected to an AC network 3 by means of a convertor transformer 2 and is directly connected to a DC line 4. The reactive power of the convertor 1 is controlled by a convertor angle control apparatus 5 that operates in a manner known to the art. For example, such a control apparatus is disclosed in the U.S. Patent to Ekstrom, U.S. Pat. No. 3,551,778, "Control System for a Static Convertor Connecting a DC Network to an AC Network".

The capacitor elements 6a, 6b and 6c are adapted to be connected and disconnected from the AC network 3 by means of step switches in order to compensate for the consumption of reactive power by the convertor 1. The capacitor elements 6a, 6b and 6c are switched under the control of a reactance switch control and voltage compensation apparatus 7 in accordance with the present invention.

It should be appreciated that while capacitor elements are shown in FIG. 1, other reactance elements such as reactors could be used in conjunction with or instead of the capacitors 6a, 6b and 6c. In addition, it is noted that the capacitor elements could be used to control reactive power as described above, or could be included in network filter or damping circuits.

The reactance switch control and voltage compensation apparatus 7 operates in response to control signals from a transducer 8 that measures the reactive power of the AC network 3 by means of a voltage transformer 9 and a current transformer 10. The transducer 8 operates in a manner known to those skilled in the art as a discriminator to emit a characteristic signal upon deviation of the reactive power of the AC network 3 from a reference value of reactive power Q0. It should be appreciated that upon a connection or disconnection of any of the capacitor elements 6a, 6b or 6c, the reactive power Q of the AC network 3 will momentarily undergo a measurable deviation and the transducer 8 will accordingly emit a signal to the reactance switch control and voltage compensation apparatus 7.

In addition, as shown in FIG. 1, a synchronous machine 11, for example a generator or a synchronous condensor, is connected to the AC network 3 and is further connected to a voltage regulator 12 which is connected to the AC network 3 by means of a voltage transformer 13.

Figure 2:
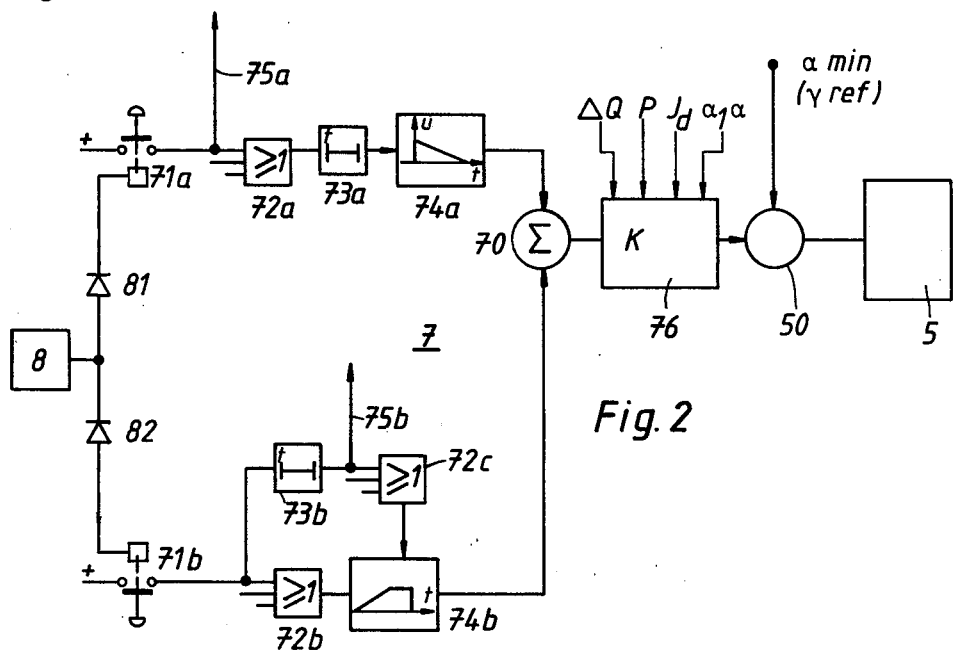
FIG. 2 shows a block diagram of a reactance switch control and voltage compensation apparatus for the capacitor bank of the circuit of FIG. 1.

The reactance switch control and voltage compensation apparatus 7 for the capacitor elements 6a, 6b and 6c is particularly illustrated by the block diagram of FIG. 2. Operation of the switch control apparatus 7 is initiated by a signal from the transducer 8. The transducer 8 is adapted to emit an electrical signal with a polarity that indicates a particular deviation of the reactive power Q of the AC network 3 from a reference Q0. Thus, for example, an "increased voltage" deviation in the AC network 3, requiring a connection of compensating capacitance, could cause the transducer 8 to generate a positive connection voltage that would, in turn, be conducted through a diode 81 to a corresponding connection conductor 71a. Likewise, a "decreased voltage" deviation, requiring a disconnection of capacitance, could cause the transducer 8 to generate a negative disconnect voltage that would be conducted through a diode 82 to a disconnect conductor 71b. Of course, it should be appreciated that the polarity of the transducer signals and the respective directions of the opposed diodes 81 and 82 could be reversed without altering the operation of the invention.

Thus, if the transducer 8 detects a change in the reactive power of the AC circuit 3 that requires an increase in the compensating capacitance of the AC circuit, a voltage is conducted through the diode 81, the conductor 71a, and a connect control output 75a. The energized connect control output 75a is applied to a plurality of suitably arranged capacitor step switches which are adapted to operate in a manner known to the art to switch additional capacitance into the AC network 3. The positive transducer signal is also passed through an OR gate 72a to a delay device 73a. Thereafter the delay device 73a passes an activation signal to a signal generator 74a just before the new capacitance is switched into the AC network 3. Of course, it should be appreciated that the delay of the delay device 73a is slightly less than the reaction time of the switches that connect the capacitors 6a, 6b and 6c to the AC circuit 3.

A few milliseconds after activation, the transducer 74a generates an incremental angle control signal that thereafter decays for a certain period of time. It should be appreciated that the signal from the generator 74a is generated at approximately the same time as the capacitance is connected to the AC network 3. In addition, it is noted that the few milliseconds of delay between the activation of the transducer 74a and the generation of the transducer signal is used to avoid disturbances in the convertor.

The decaying signal from the generator 74a is applied to a series connected summator 70, computation device 76, and a control angle summator 50 which cooperate to apply a control angle increment in the direction of 90° to the normal control angle that is generated by the convertor angle control apparatus 5 in a manner known to the art. Since the signal from the generator 74a is decaying, the angle increment signal from the cooperating summators 70 and 50 and the control device 76 is also decaying. Thus, immediately after a particular capacitance is connected to the AC circuit 3, the control angle of the angle control apparatus 5 is momentarily increased by a maximum increment in the direction of 90° in order to decrease the internal voltage of the convertor and to thereby compensate for the momentary voltage transients that were caused by the connection of capacitance to the AC network 3. Thereafter, the incremental signal is gradually reduced to return the control angle to its normal value.

It should be appreciated that in accord with the disclosure of the above-mentioned U.S. Pat. No. 3,551,778, the summator 50 is used to apply the decaying control angle increment with respect to a reference value of either an upper or lower limit to the control angle of the convertor. Thus, if the convertor operates as a rectifier, the summator 50 generates the incremental control angle change with respect to a reference value of the lower limit of the control angle $\alpha$ min. Likewise, if the convertor operates as an invertor, the summator 50 generates an increment in the control angle with respect to the smallest possible margin of commutation $\gamma 0$, which determines the upper limit of the control angle α max.

Also, in a manner known to the art, the absolute magnitude of the decaying signal that is applied to the summator 50 can be computed by a computation device 76. The computation device may, for example, include a micro processor that is adapted to monitor the magnitude of the signal from the transducer 8 ΔQ, the instantaneous power P of the convertor, the direct current I, and the control angle α, and to use these parameters to compute and set a magnitude of the incremental control angle that will keep the voltage change in the AC network within reasonable limits.

Figure 4:
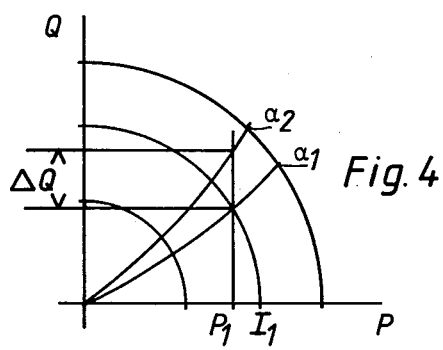
FIG. 4 shows a plot of the active power, reactive power, control angle, and current parameters of the apparatus of the invention.

More particularly, FIG. 4 illustrates the general relationship between the above-mentioned parameters, and this relation must necessarily be programmed into the computation device 76. As shown in FIG. 4, the circular curves correspond to parameter relations with respect to a constant current I, whereas the bent radial curves correspond to a constant control angle α. It should be apparent from an examination of FIG. 4, that at a certain active power P1, the control angle must be changed from α1 to α2 when the reactive power is increased by ΔQ, due to the connection of reactance elements in the AC network 3.

As shown in FIG. 2, when there is a change in the reactive power of the AC network 3 that requires a compensating decrease in circuit capacitance, the transducer 8 generates a negative voltage signal that is passed through the diode 82 and the disconnect conductor 71b to a delay device 73b and an OR gate 72b. The OR gate 72b passes the activation signal to a signal generator 74b that, in turn, generates a gradually growing signal, such as a ramp signal, that is applied to the cooperating series coupled summators 70 and 50 and computation device 76.

After the signal from the generator 74b has reached its maximum value, the delay device 73b supplies a signal to a disconnect control output 75b. The disconnect control output signal at 75b is applied to the step switches of the capacitor elements 6a, 6b and 6c in order to disconnect the appropriate capacitors from the AC circuit 3 in a manner known to the art. At approximately the time that the output signal of the delay device 73b is applied to the disconnect control output 75b, the OR gate 72c passes a signal to turn off the signal at the output of the generator 74b.

It should be apparent from the above discussion that when the transducer 8 initiates a disconnect capacitor sequence, a gradually increasing incremental control angle signal is applied to the convertor angle control apparatus 5 to gradually change the control angle of the convertor towards 90°. Of course, it should be appreciated that the cooperating summators 70 and 50 and the computation device 76 operate in the above described fashion to determine the proper incremental control angle signal to be applied to the convertor angle control apparatus 5. In addition, it should be appreciated that after the incremental control angle signal has reached its maximum value, the appropriate capacitor elements are disconnected from the AC network 3 and the incremental control angle signal is thereafter rapidly decreased to zero. Thus, the voltage transients in the AC circuit 3 that are associated with the disconnection of capacitance from the AC circuit are compensated by an appropriate momentary change in the control angle of the convertor.

Figure 3:
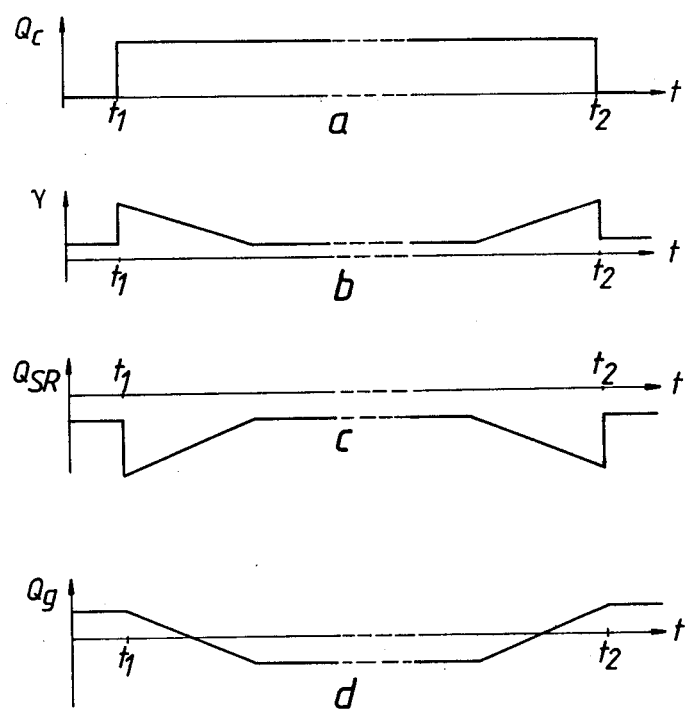
FIG. 3 illustrates typical plots of the AC circuit reactive power, margin of commutation of the convertor, reactive power of the convertor, and voltage control of a synchronous machine in accordance with the operation of the invention.

The operation of the apparatus of the invention will be better understood by reference to the characteristic plots of parameter values as shown in FIG. 3. More particularly, FIG. 3a shows a plot of the change in reactive power Qc when a capacitor element is connected to the AC circuit 3 at a time t1 and disconnected at a time t2.

FIG. 3b indicates how the margin of commutation γ0 receives an almost instantaneous addition at t1 and then gradually disappears. FIG. 3c illustrates the corresponding change of the reactive power of the convertor.

As shown in FIG. 3c the AC circuit 3 is prepared for the capacitive disconnection at the time t2 by gradually increasing the margin of commutation γ0 to the desired value and thereafter rapidly reducing the margin of commutation γ0 to the original value at t2.

It is noted that any voltage changes in the AC network 3 during the above operation will influence the voltage control of the synchronous machine 11, as shown by the reactive power plot of FIG. 3d. In order to ensure a safe voltage control of the synchronous machine 11, the signal ramps in the transducers 74a and 74b should, therefore, be made correspondingly long.

It should be appreciated that although the discussion of FIG. 3 concerns an addition to the margin of commutation γ0 in the case of, for example, an invertor, as indicated previously, the same result could be obtained by increasing the lower limit of the control angle α in the case of a rectifier.

In addition, it is noted that it is also possible to transmit the signal of the computation device 76 from one convertor to another by means of a DC transmission. Such a transmission, for example, by means of a telelink, would result in the desired voltage change taking place through the DC line. In this way the control play that might otherwise occur when the current control changes from the rectifier to a convertor is avoided.

It is noted that the OR gates 72a, 72b and 72c of FIG. 2 each have several inputs that are designed to enable the reactance switch control apparatus 7 to be used for the connection and disconnection of different reactance elements from, for example, filters, damping circuits or compensating capacitors. Furthermore, it should be appreciated that although the reactance elements can be automatically connected or disconnected from the AC network in accord with various working parameters of a convertor plant, the apparatus of the invention is also adapted to switch the reactance elements manually by means of the manual switches shown in operative association with the conductors 71a and 71b in FIG. 2.

Thus, the embodiment of the invention as shown in FIGS. 1 and 2 operates in parallel with and without disturbing the normal power control of a transmission, thereby maintaining the transmitted active power.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. An improved reactive power control apparatus of a type wherein an AC network and a DC network are connected to a static convertor and the changes in reactive power of said AC network are compensated by switching operations including switching corresponding reactance elements into and out of connection with said AC network, and by generating a normal angle to control the operation of said static convertor, said improved control comprising:

a reactance switching control and voltage compensation means for varying said normal control angle to another value to compensate for transient voltages induced by a switching operation and for returning said normal control angle to its original value, wherein said reactance switching control and voltage compensation means includes voltage control means for rapidly generating a maximum increment of said normal control angle at a switching operation and for gradually reducing said increment to zero after said switching operation to compensate for the rapid incremental change of said normal control angle.

2. The apparatus of claim 1 including means for connecting a capacitor element to the AC network to define said switching operation.

3. The apparatus of claim 1 including means for incrementing said normal control angle in the direction of 90°.

4. The apparatus of claim 1 wherein said voltage control means includes a ramp signal generator.

5. An improved reactive power control apparatus of a type wherein an AC network and a DC network are connected to a static convertor and the changes in reactive power of said AC network are compensated by switching operations including switching corresponding reactance elements into and out of connection with said AC network, and by generating a normal angle to control the operation of said static convertor, said improved control comprising:

a reactance switching control and voltage compensation means for varying said normal control angle to another value to compensate for transient voltages induced by a switching operation and for returning said normal control angle to its original value, wherein said reactance switching control and voltage compensation means includes voltage control means for gradually changing said normal control angle to a maximum incremented angle immediately prior to a switching operation and for rapidly reducing the increment of said angle to zero after the switching operation.

6. The apparatus of claim 5 including means for disconnecting a capacitor element to define said switching operation.

7. The apparatus of claim 5 wherein said AC network includes a synchronous machine operatively connected to an associated voltage control means and said smooth transfer of said normal control angle to or from its normal value takes place so slowly that the voltage control means of said synchronous machine is able to maintain the alternating voltage of said machine within specified limits.

8. The apparatus of claim 5 wherein said reactance switching control and voltage compensation means includes a computation and control means for setting the magnitude of said increment in said normal control angle in accord with the working parameters of said convertor to maintain the voltage changes in said AC network within desired limits.

9. The apparatus of claim 5 including means for incrementing said normal control angle in the direction of 90°.

10. The apparatus of claim 5 wherein said voltage control means includes a ramp signal generator.

11. The apparatus of claim 1 wherein said AC network includes a synchronous machine operatively connected to an associated voltage control means and said smooth transfer of said normal control angle to or from its normal value takes place so slowly that the voltage control means of said synchronous machine is able to maintain the alternating voltage of said machine within specified limits.

12. The apparatus of claim 1 wherein said reactance switching control and voltage compensation means includes a computation and control means for setting the magnitude of said increment in said normal control angle in accord with the working parameters of said convertor to maintain the voltage changes in said AC network within desired limits.

* * * * *

UNITED STATES PATENT AND TRADEMARK OFFICE
CERTIFICATE OF CORRECTION

PATENT NO. : 4,199,804
DATED : April 22, 1980
INVENTOR(S) : Juhlin, Lars-Erik

It is certified that error appears in the above—identified patent and that said Letters Patent is hereby corrected as shown below:

Column 8, line 3, change "after" to --at--.

Signed and Sealed this

Twenty-sixth Day of May 1981

[SEAL]

Attest:

RENE D. TEGTMEYER

Attesting Officer

Acting Commissioner of Patents and Trademarks